United States Patent
Suryanarayana et al.

(10) Patent No.: US 9,971,532 B2
(45) Date of Patent: May 15, 2018

(54) GUID PARTITION TABLE BASED HIDDEN DATA STORE SYSTEM

(71) Applicant: Dell Products L.P., Round Rock, TX (US)

(72) Inventors: Shekar Babu Suryanarayana, Bangalore (IN); Neeraj Joshi, Puducherry (IN)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 15/052,666

(22) Filed: Feb. 24, 2016

(65) Prior Publication Data

US 2017/0242605 A1  Aug. 24, 2017

(51) Int. Cl.
G06F 3/06 (2006.01)

(52) U.S. Cl.
CPC ............ *G06F 3/0622* (2013.01); *G06F 3/067* (2013.01); *G06F 3/0637* (2013.01); *G06F 3/0644* (2013.01)

(58) Field of Classification Search
CPC .... G06F 3/0637; G06F 3/0622; G06F 3/0644; G06F 3/067

USPC ........................................................ 711/163
See application file for complete search history.

(56) References Cited

U.S. PATENT DOCUMENTS

| | | | |
|---|---|---|---|
| 6,725,178 B2 | 4/2004 | Cheston et al. | |
| 2015/0220737 A1* | 8/2015 | Rothman | G06F 21/572 726/1 |

* cited by examiner

*Primary Examiner* — Jasmine Song
(74) *Attorney, Agent, or Firm* — Haynes and Boone, LLP (57) ABSTRACT

A GUID partition table (GPT) based Hidden Data Store (HDS) system includes first computing systems that include networked storage devices and that are coupled to a second computing system through a network. The second computing system include local storage devices that provide a GPT having a GPT entry that identifies local HDS elements that provides an HDS and that are included on the local storage devices, and networked HDS elements that provide the HDS and that are included on the networked storage devices. The second computing system also includes an HDS engine that receives the GPT entry and authorization credentials, determines that the authorization credentials allow access to the HDS and, in response, provides access to the local HDS elements that are included on the local storage devices, and provide access to the networked HDS elements that are included on the networked storage devices.

20 Claims, 7 Drawing Sheets

GUID PARTITION TABLE BASED HIDDEN DATA STORE SYSTEM

BACKGROUND

The present disclosure relates generally to information handling systems, and more particularly to providing a hidden data store for information handling systems using a Globally Unique Identifier (GUID) partition table.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers, sometimes utilize storage systems such as, for example, Redundant Arrays of Independent Disk (RAID) storage system for the storage and retrieval of data. Those servers may be coupled to their storage systems by variety of different controller subsystems such as for example, host bus adapters (HBAs), storage controllers, and/or other pass-through devices known in the art. However, the use of such controller subsystems suffers from a variety of issues. For example, in the event of a failure (e.g., a disk failure) in the controller subsystem or accidental/unintentional formatting of a storage subsystem in the storage system, the data in that storage subsystem is lost. Conventional solutions to this issue require the user to perform daily data backups of critical data to remote servers and/or storage subsystems, which is time-consuming and tedious for the user.

In another example, in the event of an operating system failure in a server, a user will be unable to access the data in the storage subsystem accessed by that server until the operating system is repaired and/or restored on that server, or unless other servers are available (e.g., for importing data disks to a server to access the data). In a specific example, in the HADOOP® architecture, when a secondary name node in a storage subsystem is unavailable due to operating system failure/unavailability, there is no way to retrieve the latest edit logs to locate data nodes, and the entire application will slow down due to name node unavailability. In yet another example, with the current Universal Extensible Firmware Interface (UEFI) implementation, data on a storage subsystem cannot be accessed during a pre-boot or while in a pre-operating-system environment.

Accordingly, it would be desirable to provide an improved data storage system.

SUMMARY

According to one embodiment, an Information Handling System (IHS) includes a communication system; at least one local storage device; a processing system that is coupled to the communication system and the at least one storage device; and a memory system that is coupled to the processing system and that includes instruction that, when executed by the processing system, cause the processing system to: receive a GPT entry and authorization credentials; determine that the authorization credentials allow access to a Hidden Data Store (HDS) and, in response, access a Globally Unique Identifier (GUID) partition table (GPT) that includes the GPT entry that identifies at least one local HDS element that provides the HDS and that is included on at least one local storage device included in the first computing system, and at least one networked HDS element that provides the HDS and that is included on at least one networked storage device that is coupled to the communication system; and providing access to the at least one local HDS element that is included on the at least one local storage device, and providing access to the at least one networked HDS element that is included on the at least one networked storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
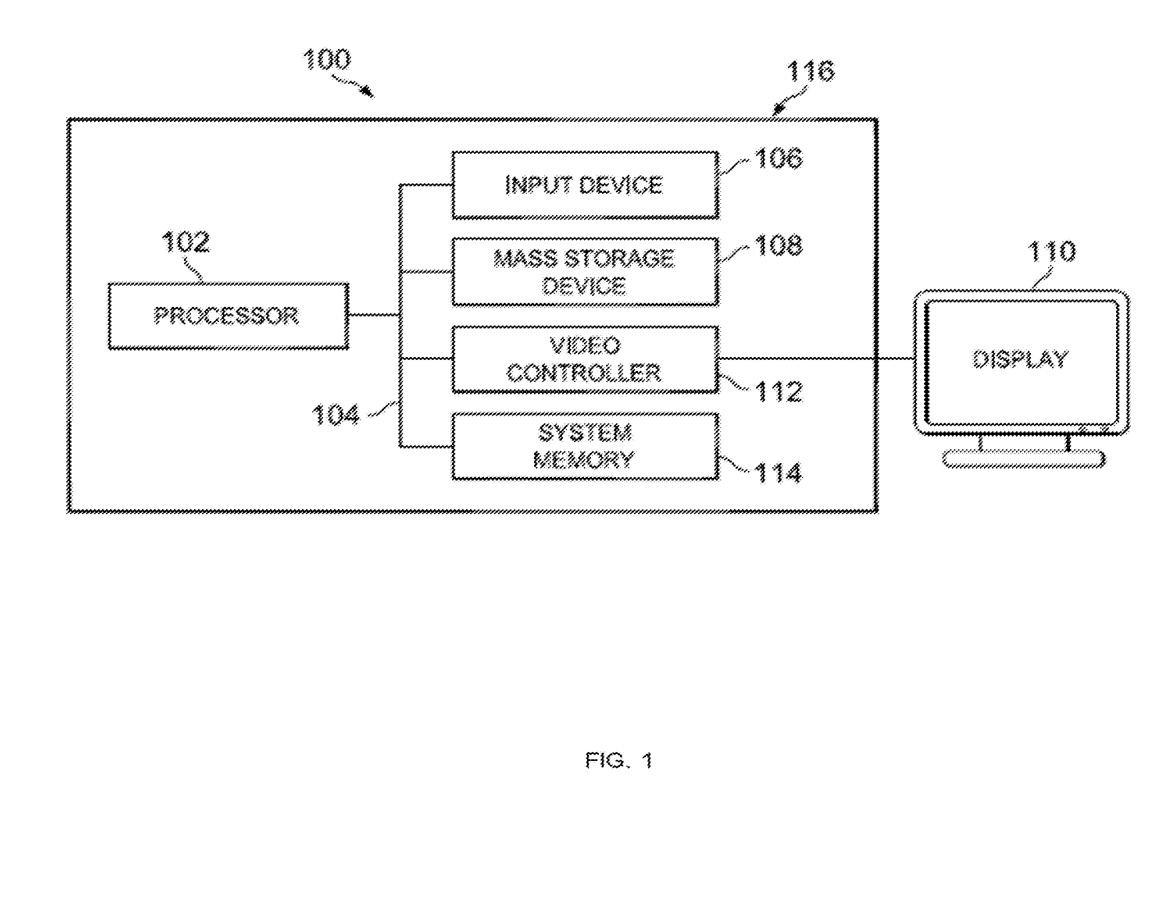
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard disks, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
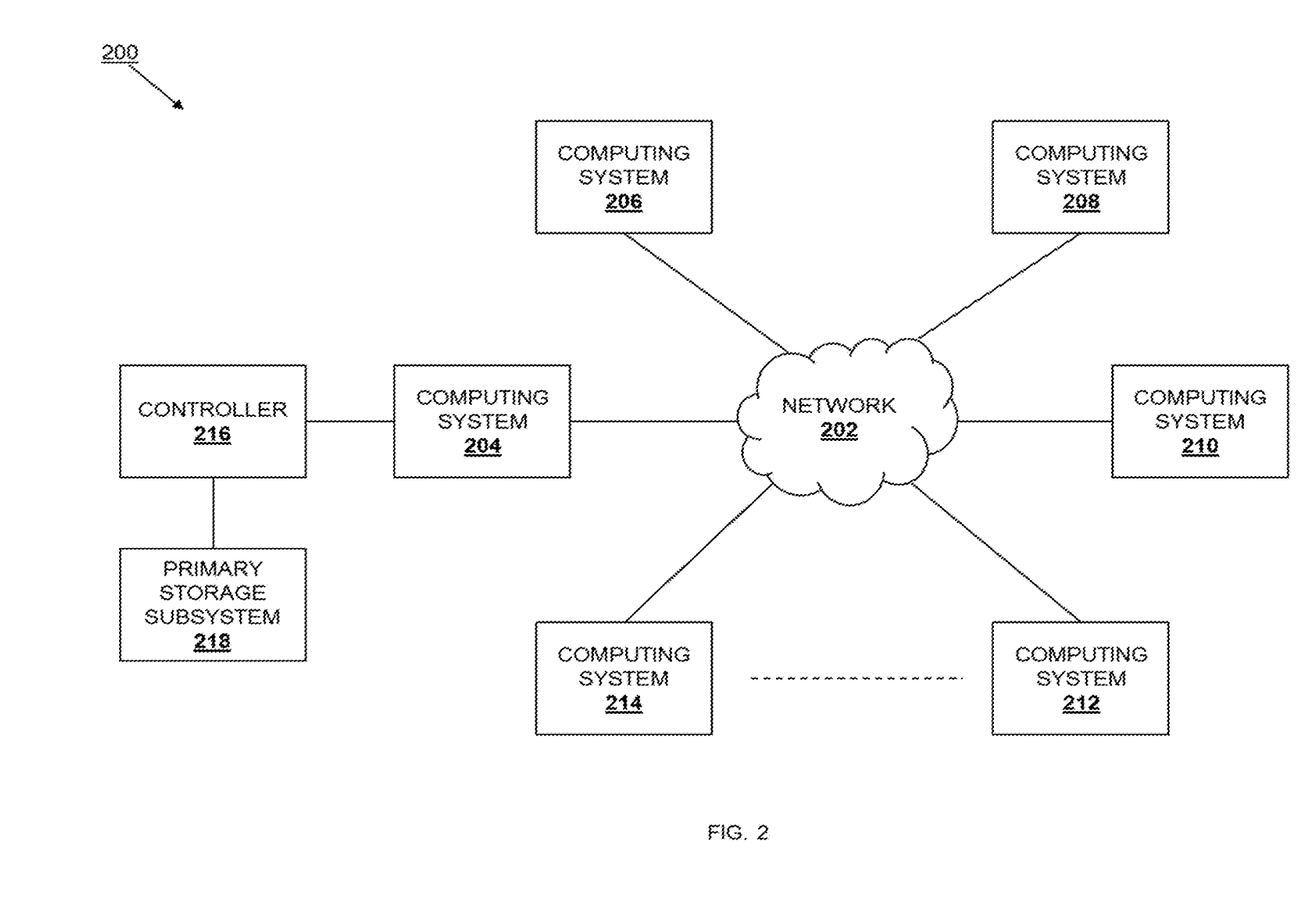
FIG. 2 is a schematic view illustrating an embodiment of a GPT based HDS system.

Referring now to FIG. 2, an embodiment of a Globally Unique Identifier (GUID) partition table (GPT) based Hidden Data Store (HDS) system 200 is illustrated. The GPT-based HDS system 200 includes a network 202 that couples a plurality of computing systems 204, 206, 208, 210, 212, and up to 214 together. In an embodiment, the network 202 may include a storage area network (SAN), a local area network (LAN), the Internet, and/or a variety of other networks known in the art. Any or all of the computing systems 204-214 may be the IHS 100 discussed above with reference to FIG. 1 and/or may include some or all of the components of the IHS 100. In specific embodiments discussed below, the computing systems 204-214 are described as including servers and/or rack subsystems, although other computing systems (e.g., desktop computing devices, laptop/notebook computing devices, tablet computing devices, networking devices, etc.) are envisioned as benefiting from the teachings of the present disclosure and thus falling within its scope. In a specific example, the computing systems are provided in a datacenter.

Many of the examples provided below discuss the functionality of the computing system 204, which is illustrated in FIG. 2 as being coupled by a controller 216 to a primary storage subsystem 218. In different embodiments, the controller 216 may be a host bus adapter (HBA), a RAID storage controller, a storage subsystem pass-through device, and/or other controllers known in the art that provide access to the primary storage subsystem 218 that may be provided by a Redundant Array of Independent Disks (RAID) storage subsystem and/or other storage subsystems known in the art. However, one of skill in the art in possession of the present disclosure will recognize that any of the computing systems 206-214 may operate in substantially the same manner as described below for the computing system 204 (including being coupled to respective controllers and primary storage subsystems), with the computing system 204 operating in substantially the same manner as described below for the computing systems 206-214 when one of those computing systems 206-214 creates and/or accesses an HDS as described below.

Figure 3:
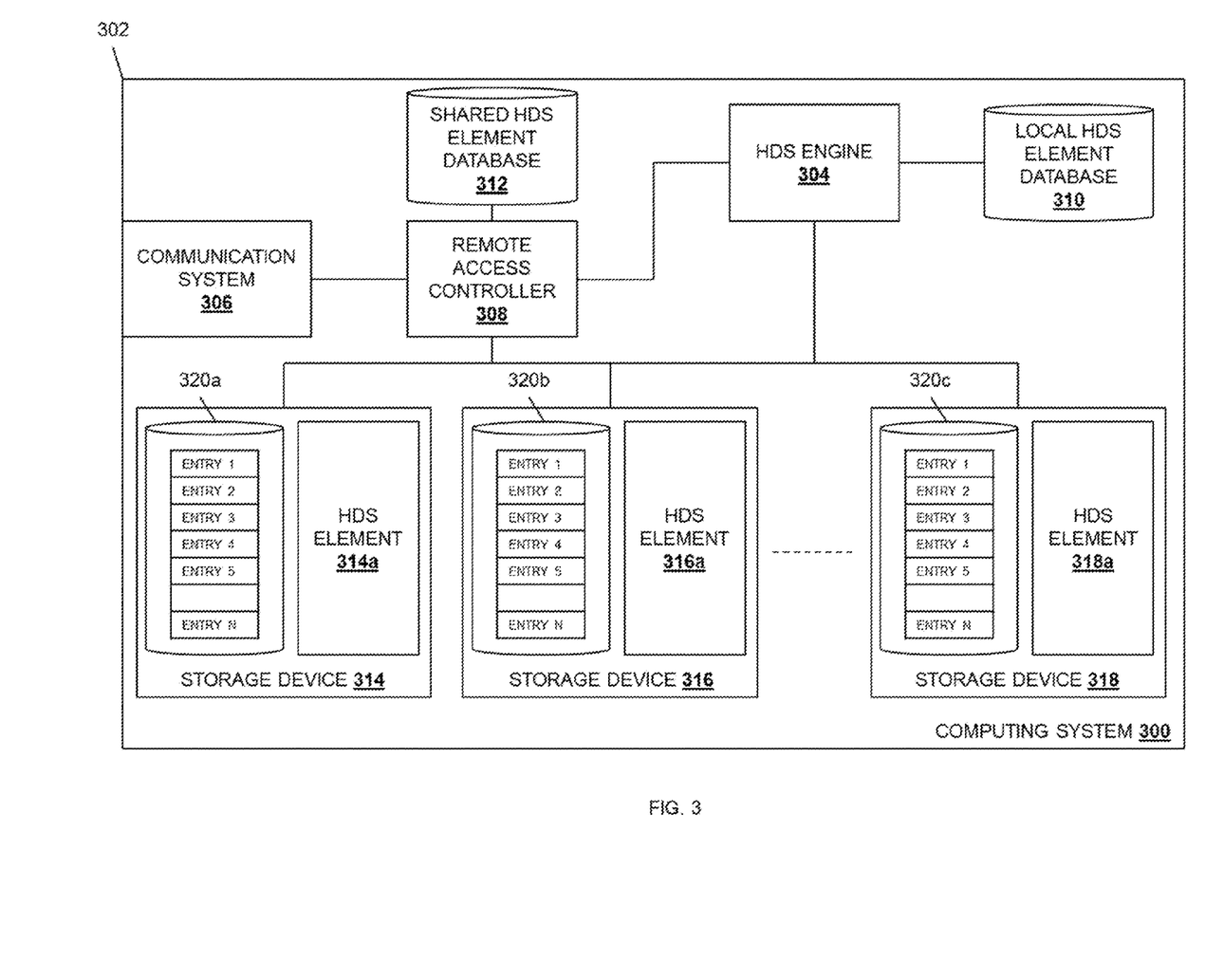
FIG. 3 is a schematic view illustrating an embodiment of a computing systems used in the GPT based HDS system of FIG. 2.

Referring now to FIG. 3, an embodiment of a computing system 300 is illustrated that may be any of the computing systems 204-214 discussed above with reference to FIG. 2. As such, the computing system 300 may be the IHS discussed above with reference to FIG. 1 and/or may include some or all of the components of the IHS 100, and in specific embodiments may include a server and/or rack subsystem (although other computing systems are envisioned as falling within the scope of the present disclosure). In the examples provided below, the computing system 300 provides specific functionality for the computing device 204, and specific functionality for the computing devices 206-214, and one of skill in the art in possession of the present disclosure will recognize that the computing system 300 may provide each of those specific functionalities for any of the computing systems 204-216 depending on whether that computing system is creating an HDS, accessing an HDS, or providing an HDS element as discussed below. In an embodiment, the computing system 300 includes a chassis 302 that houses the components of the computing system 300, only some of which are illustrated in FIG. 3. For example, the chassis 302 may include a server chassis that houses the components of a server that provides the computing system 300. In another example, the chassis 302 may include a rack that houses a server that provides the computing system 300.

In an embodiment, the chassis 302 may house a processing system (not illustrated, but which may be the processing system 102 discussed above with reference to FIG. 1) and a memory system (not illustrated, but which may be the memory system 114 discussed above with reference to FIG. 1) that includes instructions that, when executed by the processing system, cause the processing system to provide an HDS engine 204 that is configured to perform the functions of the HDS engines and computing systems discussed below. The chassis 302 also houses a communication system 306 that, in the examples discussed below, couples the computing system 204/300 to the network 202, the controller 216, and/or other networking components known in the art. In an embodiment, the communication system 306 may be provided by a network access controller (NIC), a wireless communication device, and/or other communication systems 306 known in the art. In the illustrated embodiment, a remote access controller 308 is housed in the chassis 302 and couples the HDS engine 304 to the communication system 306 (e.g., via couplings between the remote access controller 308 and each of the processing system and the communication system 306). In a specific example, the remote access controller may be a DELL® remote access controller (iDRAC®) provided by DELL® Inc. of Round Rock, Tex., United States, and may be provided in a server chassis that houses the components of the computing system 300, provided in a rack and coupled to a server that provides the computing system 300, and/or provided in a variety of other manners known in the art.

The chassis 302 also houses a storage device (not explicitly illustrated, but that may include the storage device 108 discussed above with reference to FIG. 1) that is coupled to each of the HDS engine 304 (e.g., via a coupling between the storage device and the processing system) and the remote access controller 308 (e.g., via a coupling between the storage device and the remote access controller 308), and that includes a local HDS element database that is accessible by the HDS engine 304, and a shared HDS element database 312 that is accessible by the remote access controller 308. As discussed in further detail below, the local HDS element database 310 may associate local storage devices (e.g., storage devices in the computing system 300) that store local HDS elements for HDSs provided in the GPT-based HDS system 200 with entries in a GPT, and the shared HDS element database 312 may associate networked storage devices (e.g., storage devices couple to the computing system 300 through the communication system 306) with entries in the GPT. In addition, the chassis 302 may house (within the chassis 302), or direct couple to (via an external connector accessible on the chassis 302 such as a Universal Serial Bus (USB) connector or other external connectors known in the art), a plurality of storage devices 314, 316, and up to 318. As discussed below, the storage devices 314-318 may include hard disk drives (HDDs) housed in or directly coupled to the chassis 302, solid state drives (SSDs) housed in or directly coupled to the chassis 302, secure digital (SD) cards housed in or directly coupled to the chassis 302, USB flash devices (e.g., USB drives) housed in or directly coupled to the chassis 302, embedded media cards (EMCs) housed in or directly coupled to the chassis 302, and/or any other storage device that may be housed in or directly coupled to the chassis 302. As discussed below, in some embodiments storage devices (e.g., the SD cards, USB flash devices, EMCs, etc.) may be controlled by the remote access controller 308.

As discussed below, each of the storage devices 314-318 may store a copy of a GPT 320 (e.g., the GPTs 320a, 320b, and 320c included in storage devices 314, 316, and 318, respectively, illustrated in FIG. 3) that includes a plurality of GPT entries (e.g., entries 1-N in each GPT 320a, 320b, and 320b in the illustrated embodiment), each of which may identify an HDS that includes at least one HDS element and that are included on at least one local and/or networked storage device. In addition, each of the storage devices 314-318 may store one or more HDS elements (e.g., the HDS elements 314a, 316a, and 318a included in storage devices 314, 316, and 318, respectively, illustrated in FIG. 3) identified by the GPT entries in the GPT 320. Thus, while only one HDS element 314a, 316a, and 318a is illustrated as located on each storage device 214, 216, and 318, one of skill In in the art in possession of the present disclosure will recognize that more HDS elements may be provided on any storage device while remaining within the scope of the present disclosure.

As discussed below, the designation of "local" and "networked" below with regard to the storage devices and HDS elements is defined from the point of view of the computing system creating or access an HDS. In a specific example, the storage devices 314-318 may be considered local storage devices that store local HDS elements when the computing device 204/300 is creating or accessing HDS elements provided in storage devices that are housed in or directly coupled to the chassis 302, and the storage devices 314-318 may be considered networked storage devices that store networked HDS elements when the computing device 204 is creating or accessing HDS elements provided in storage devices that are housed in or directly coupled to any of the other computing devices 206-214. As such, one of skill in the art in possession of the present disclosure will recognize that any of the storage devices 314-318 included in any computing devices 204-214 may be considered local or networked storage devices depending on how (and by which computing system) those storage devices are being used in the method 400 below. While a specific computing device has been illustrated and described, one of skill in the art in possession of the present disclosure will recognize that components may be modified, added, and/or removed from the computing system 300 in order to provide the functionality described below and/or to provide conventional functionality known in the art while remaining within the scope of the present disclosure.

Figure 4:
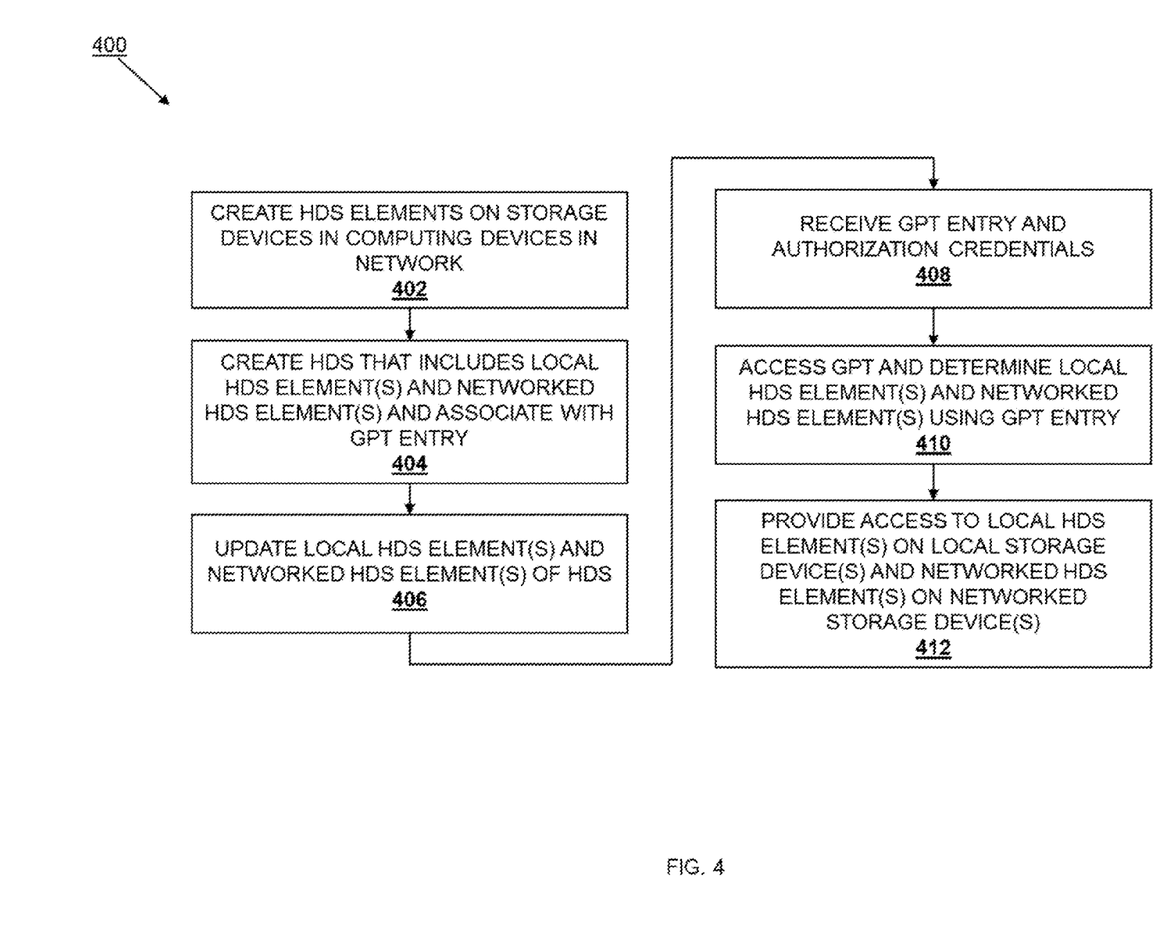
FIG. 4 is a flow chart illustrating an embodiment of a method for providing a hidden data store using a GUID partition table.

Referring now to FIG. 4, an embodiment of a method 400 for providing a hidden data store is illustrated. As discussed below, the system and methods of the present disclosure provide an intelligent GPT-based storage device partition management system that creates and provides access to HDSs that may be used for user confidential and critical data. The HDS may utilize hard disk drives, solid state drives, secure digital cards, flash drives, embedded media cards, and/or other storage devices that may be local to the computing system accessing the HDS or networked with the computing device accessing the HDS, thus allowing the HDS to include HDS elements that are distributed across different storage devices in a network. The HDS may be provided as a redundant data storage to backup confidential and critical data, or as an extended, primary data storage when a computing system does not include sufficient storage for its confidential and critical data. As discussed below, the systems and methods of the present disclosure allow for access to data stored in a redundant HDS when there is a failure (e.g., a disk failure) in a storage controller or accidental/unintentional formatting of a primary storage subsystem, in the event of an operating system failure of a computing system that created the HDS, during a pre-boot or pre-operating-system environment, while also provided other benefits detailed below.

The method 400 begins at block 402 where HDS elements are created on storage devices in computing devices in a network. In an embodiment, a user of any of the computing systems 204-216 may create a GPT partition on a local storage device (e.g., a hard disk drive, a solid state drive, etc.) and, in response, an Extensible Firmware Interface (EFI) application on that computing system may then operate to create one or more HDS elements that utilize local storage devices (e.g., the storage devices 314, 316, and up to 318 in the computing system 300 creating the HDS elements) and networked storage devices (e.g., e.g., the storage devices 314, 316, and up to 318 in the computing systems 300 coupled to the computing system creating the HDS elements) at a storage capacity up to what is available (or what has been advertised as available by the computing systems 204-214). For example, in response to creating a GPT on a partition of a local storage device in the computing system, the user of that computing system may be displayed the available local storage devices upon which HDS element(s) may be provided (e.g., local hard disk drives, solids state drives, secure digital cards, flash drives, embedded media cards, etc.) The user may then select the local and networked storage devices upon which they would like the HDS elements to be provided (e.g., selecting a local or networked hard disk drive, selecting local or networked hard disk drive(s) and SD card(s), selecting local or networked hard disk drive(s) and EMC(s), etc.).

In an embodiment, the remote access controllers 308 in any of the computing systems 204-216 may be configured to advertise any HDS elements that are provided on their local storage devices 314-318 as "shared", which will cause the remote access controllers 308 in the computing systems 204-216 to link the shared HDS elements in the shared HDS element database 312 with the storage devices upon which those shared HDS elements are located (e.g., via a Media Access Control (MAC) address of the server that includes that storage device). Furthermore, the HDS engine 304 in any of the computing systems 204-216 may be configured to link the local HDS elements in the local HDS element database 310 with the storage devices upon which those local HDS elements are located (e.g., via a memory address or memory address range provided in the storage device). The remote access controllers 308 in each of the computing systems 204-214 may then communicate with each other to periodically update the status of shared HDS elements so that the shared HDS element database 312 may be up-to-date with each networked HDS element available in the network. Thus, each of the computing systems 204-214 may partition any of their storage devices 314-318 to include a GPT, may create HDS elements on any of their local storage devices 314-318, and advertise whether those HDS elements are shared to the other computing systems in the network. As such, each computing system 204-214 may store relationships between their local storage devices 314-318 and HDS elements 314a, 316a, and 318a, respectively, in the local HDS element database 310, as well as relationships between networked-connected shared HDS elements and the computing devices/storage devices they are stored on in the shared HDS element database 312.

The method 400 then proceeds to block 404 where an HDS is created that includes local HDS element(s) and networked HDS element(s). In some embodiments, the HDS engine 304 in the computing system 204/300 may create the HDS as a redundant storage for data stored in the primary storage subsystem 218 via the controller 216. In some embodiments, the HDS engine 304 in the computing system 204/300 may create the HDS as an extended primary storage for data (e.g., when the primary storage subsystem 218 is not provided or does not include sufficient storage capacity for the computing system 204). In an embodiment, the local HDS element(s) and/or networked HDS element(s) that provide an HDS are "hidden" in that an operating system (provided on a computing system that includes the storage devices that store those HDS element(s)) is not aware or cannot "see" those HDS element(s).

In an embodiment, the HDS engine 304 of the computing system 204/300 (i.e., the computing system creating the HDS in this example) may be configured to receive and execute code provided by a user such as, for example, "$cp -HDS c:/Critical data (source file)", to create an HDS. For example, when an EFI application in the computing system 300 receives the copy command "$cp" with the parameter "-HDS", the user of the computing system 300 may be displayed the available storage devices upon which the HDS should be created (e.g., local and networked hard disk drives, solids state drives, secure digital cards, flash drives, embedded media cards controlled by the remote access controllers, etc.) The user may then select the local and networked storage devices upon which they would like the HDS to be provided. In some embodiments, an HDS provided on local and/or networked storage devices may be configured by the user by, for example, defining the amount of storage capacity to be used from each local and/or networked storage device in order to provide the HDS (e.g., x capacity from a first local storage device, y capacity from a first networked storage device, z capacity from a second networked storage device, etc.) As such, the HDS elements on local and networked storage devices may be summed to create relatively large HDSs that can accommodate relatively large data volumes. With regard to networked storage devices, when a user selects an HDS element on a networked storage device for use in creating an HDS, the remote access controller 308 in the computing system 300 that includes that networked storage device may receive that request and, in response, provide information about that HDS element that may be used to create a GPT entry in the GPT that points to that HDS element.

Figure 5:
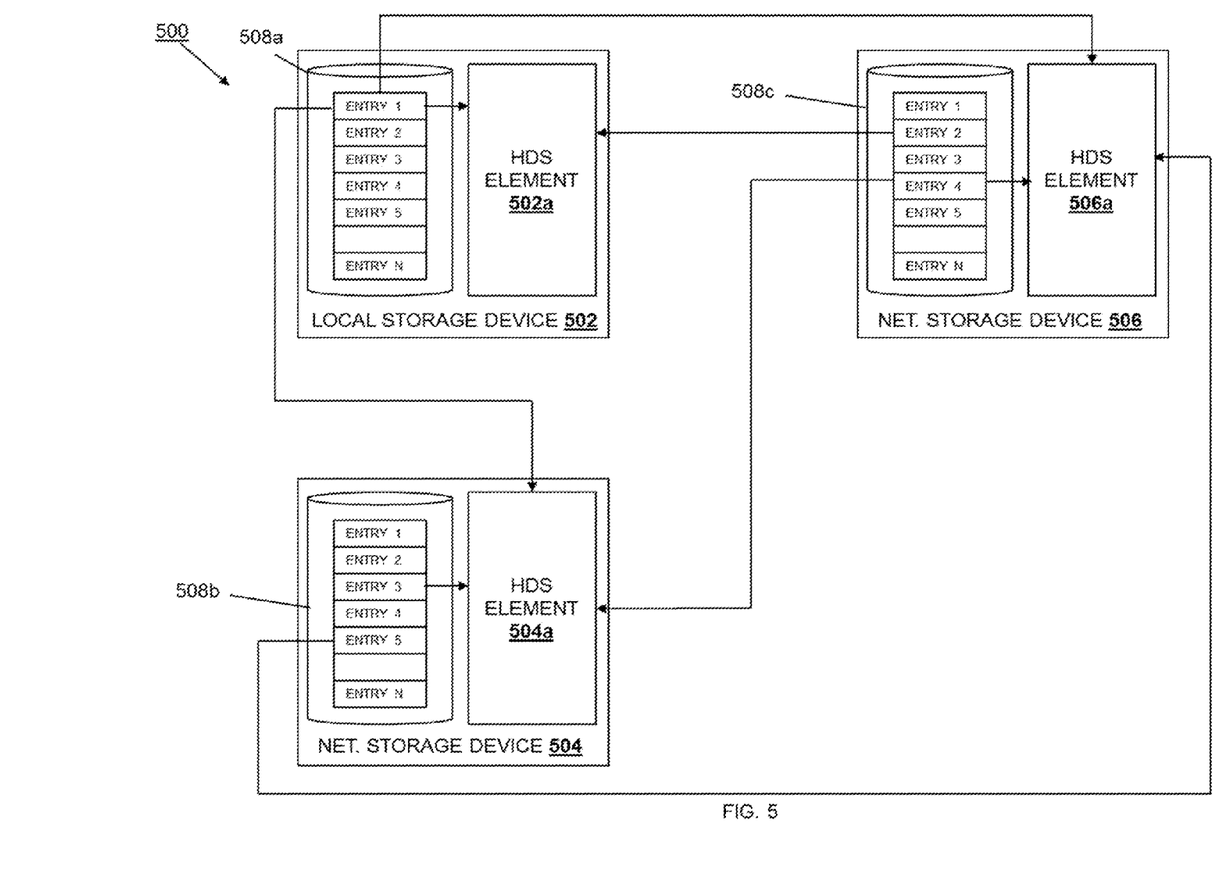
FIG. 5 is a schematic view illustrating an embodiment of GUID partition table entry relationships with hidden data store elements.

Referring now to FIG. 5, an embodiment of a GPT-based HDS system 500 is illustrated that is provided from the point of view of the computing system 204 and that includes a local storage device 502 that provided in the computing system 204 (which may be any of the storage devices 314-318 in the computing system 204/300), and a pair of networked storage devices 504 and 506 that may be provided on any of the other computing systems 206-214 (which may be any of the storage devices 314-318 in the computing systems 206-214 that are coupled through the network to the computing system 204). Each of the local storage device 502 and the networked storage devices 504 and 506 include a copy of a GPT 508 (e.g., the GPTs 508a, 508b, and 508c, respectively), and HDS elements 502a, 504a, and 506a, respectively. As can be seen, an entry 1 in the GPT 508 points to the HDS element 502a in the local storage device 502, the HDS element 504a in the networked storage device 504, and the HDS element 506a in the networked storage device 506. Similarly, an entry 2 in the GPT 508 points to the HDS element 502a in the local storage device 502, an entry 3 in the GPT 508 points to the HDS element 504a in the networked storage device 504, an entry 4 in the GPT 508 points to the HDS element 504a in the networked storage device 504 and the HDS element 506a in the networked storage device 506, and an entry 5 in the GPT 508 points to the HDS element 506a in the networked storage device 506. As such, one of skill in the art in possession of the present disclosure will recognize how GPT entries may be created that point to HDS elements provided in storage devices that are local to and/or networked with any of the computing systems 204-214 in the GPT-based HDS system 200.

As discussed above, each computing system 204-214 may store information about its local HDS elements in the local HDS element database 310, as well as information about shared HDS elements in the shared HDS element database 312. Furthermore, when an HDS is created, each computing device may map that HDS to its local storage devices that include local HDS elements for that HDS in the local HDS element database 312, and map that HDS to networked storage devices that include networked HDS elements for that HDS in the shared HDS element database 312. For example, the HDS engine 304 may store and update a local HDS list in the local HDS element database 310 that may include entries such as:

({SM-1}-{E1}>>{HDS-1})
({SM-1}-{E5}>>{HDS-N})
({SM-N}-{E5}>>{HDS-1})
({SM-N}-{E1}>>{HDS-N})

Where "SM" indicates storage media (e.g., any of the storage devices discussed above), "E" indicates an entry in the GPT, and "HDS" indicates the HDS of interest.

In another example, the remote access controller 308 may store and update a shared HDS list in the shared HDS element database 312 that may include entries such as:

({HDN-1}-{E3}>>{HDN-N}-{HDS-1})
({HDN-2}-{E2}>>{HDN-2}-{HDS-2})
({HDN-6}-{E4}>>{HDN-4}-{HDS-5})

({HDN-1}-{E1}>>{HDN-3}-{HDS-4})
({HDN-1}-{E5}>>{HDN-1}-{HDS-1})
. . .
({**************}>>{HDN-3}-{HDS-2})
({**************}>>{HDN-1}-{HDS-1})
({**************}>>{HDN-3}-{HDS-4})
({**************}>>{HDN-3}-{HDS-1})

Where "HDN" indicates a Hidden Data Node, "E" indicates an entry in the GPT, "HDS" indicates the HDS of interest, and "************" indicates that an HDN that has shared a storage device includes an HDS that is available for use (i.e., where a user may store data if a currently used HDS is full or filling up).

Figure 6:
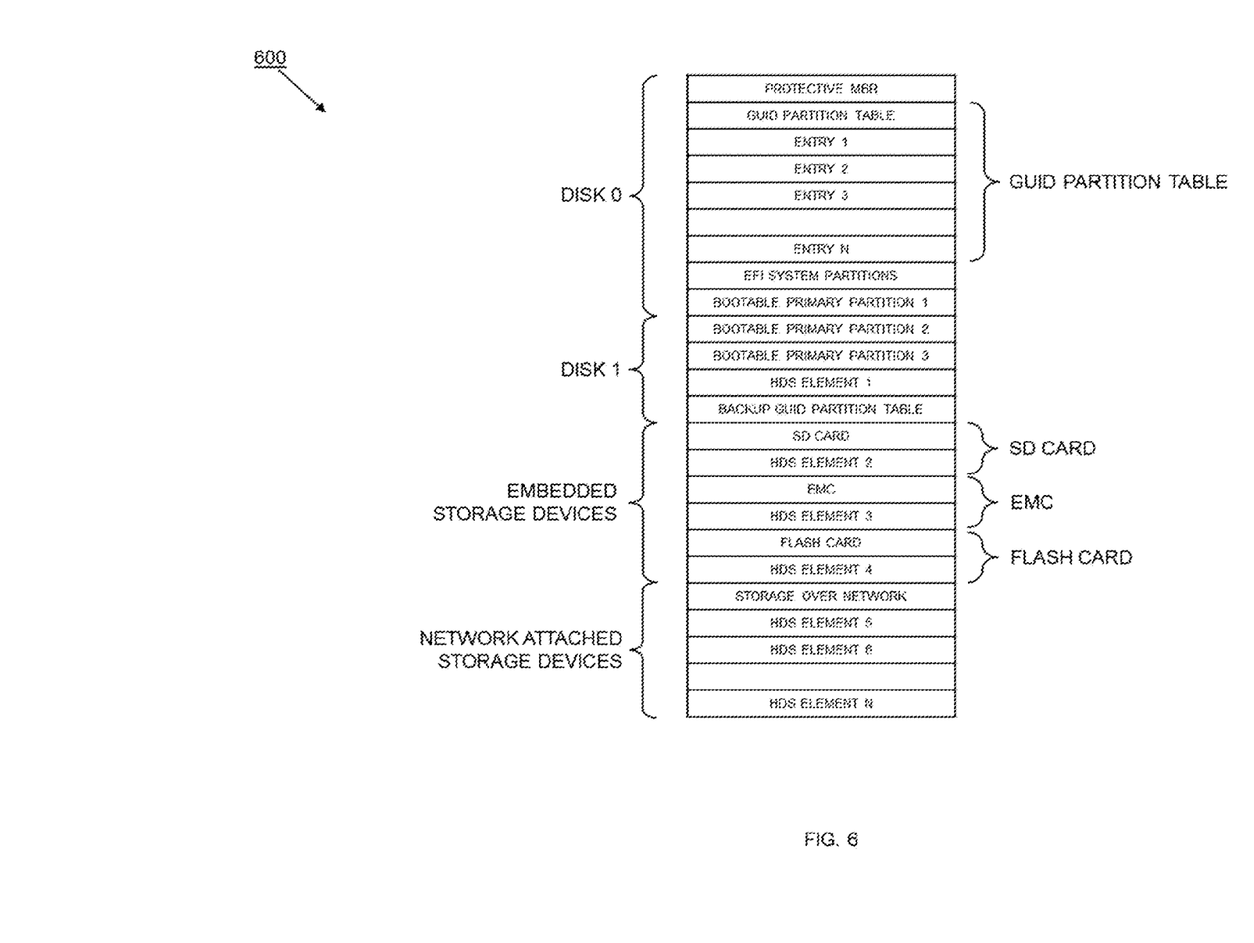
FIG. 6 is a schematic view illustrating an embodiment of a GPT/storage device/HDS element relationships.

In an embodiment, the implementation of the HDS via the GPT allows mapping from a storage device to an HDS, and then back from the HDS to the storage device ("reflex mapping"). For example, a GPT entry can point to an HDS that includes HDS elements distributed across local and networked storage devices, and each of the HDS elements on those local and networked storage devices can point back to the GPT entry for that HDS. Using such reflex mapping, a HDS defined by a GPT entry can be located so that data may be stored on that HDS, and that GPT entry can then be used to access that stored data from anywhere in the network (e.g., via an out-of-band controller such as the remote access controller 308). FIG. 6 illustrates an embodiment of GPT/storage device/HDS element relationships 600 that are provided between local storage devices on a computing system and networked storage devices that are coupled to that computing system through a network. For example, the GPT/storage relationships 600 indicate how the computing system may include a DISK 0, a DISK 1, and EMBEDDED STORAGE DEVICES. As can be seen, the DISK 0 provides a GPT including entries 1-N, the DISK 1 provides an HDS element 1 and a backup GPT, and the EMBEDDED STORAGE DEVICES include an SD CARD that provides an HDS element 2, an EMC that provides an HDS element 3, and a FLASH CARD that provides an HDS element 4. Furthermore, the GPT/storage device/HDS element relationships 600 indicates how NETWORK ATTACHED STORAGE DEVICES may provide HDS elements 6-N (e.g., on hard disk drives, solid state drives, SD cards, EMCs, flash drives, etc.) An example of the reflex mapping discussed above includes entry 1 in the GPT pointing to HDS element 3 provided on the EMC, with the HDS element 3 pointing back to the entry 1 in the GPT. Another example of the reflex mapping discussed above includes entry 2 in the GPT pointing to HDS element 1 provided on DISK 1 and HDS element 5 provided on NETWORK ATTACHED STORAGE, with the HDS element 1 and HDS element 5 both pointing back to the entry 2 in the GPT.

As discussed above, the network of HDSs provided according to the teachings of the present disclosure can be configured for redundant data storage (e.g., for the primary storage subsystem 218), or as an extended primary data storage that may be used to accommodate bulk storage of large data volumes. With the reflex mapping discussed above that is created at the GPT level, the management of the data stored in the HDSs is very efficient, and redundant data storage can be achieved using, for example, the local HDS list maintained by the HDS engines 304 and the shared HDS list maintained by the remote access controllers 308. Furthermore, as discussed below, the reflex mapping and use of the GPT entries to point to HDS elements that provide an HDS allow a user to boot any of the computing systems 204-214 to an EFI shell, provide a GPT entry for a desired HDS, and retrieve data stored in that HDS without the need to have an operating system running on the computing system they are using.

The method 400 then proceeds to block 406 where local HDS element(s) and networked HDS element(s) are updated. In an embodiment, any of the computing devices 204-214 may operate to cause data to be stored in the HDS(s) they created at blocks 404. For example, when the HDS has been provided for redundant data storage for the primary storage subsystem 218, the HDS engine 304 in the computing device 204/300 may determine that data is being stored in the primary storage subsystem 218 (e.g., via the controller 216) and, in response, may identify the GPT entry for the redundant HDS. Using that GPT entry which, as discussed above, points to the local HDS element and networked HDS elements that provide the HDS, the HDS engine 304 and the remote access controller 308 may access the local HDS element database 310 and the shared HDS element database 312, respectively, to determine the local storage devices (e.g., via the local HDS list discussed above) and the networked storage devices (e.g., via the shared HDS list discussed above) on which to store copies of the data that is being stored on the primary storage subsystem. At block 406, which may be performed whenever the computing system 204 writes data to the primary storage subsystem 218, the HDS engine 304 may write a copy of at least a portion of that data to HDS networked element(s) on the local storage device(s) in the computing system 204, while the remote access controller 308 provides a copy of at least a portion of that data to be written to networked HDS element(s) on the networked storage device(s) in the computing system(s) 206-214. In an embodiment, data provided for storage in an HDS element may be compressed and stored in that HDS element as a compressed image.

Similarly, when the HDS has been provided for extended data storage, the HDS engine 340 in the computing device 204/300 may receive instructions to store data on the extended HDS and, in response, may identify the GPT entry for the extended HDS. Using that GPT entry which, as discussed above, points to the local HDS element and networked HDS elements that provide the HDS, the HDS engine 304 and the remote access controller 308 may access the local HDS element database 310 and the shared HDS element database 312, respectively, to determine the local storage devices (e.g., via the local HDS list discussed above) and the networked storage devices (e.g., via the shared HDS list discussed above) on which to store the data associated with the received storage instruction. At block 406, which may be performed whenever the computing system 204 is used to store data, the HDS engine 304 may write at least a portion of that data to HDS networked element(s) on the local storage device(s) in the computing system 204, while the remote access controller 308 provides at least a portion of that data to be written to networked HDS element(s) on the networked storage device(s) in the computing system(s) 206-214. As such, the local HDS element(s) and networked HDS element(s) for each HDS provided in the GPT-based HDS system 200 may be updated any time data is stored in the system. In an embodiment, data provided for storage in an HDS element may be compressed and stored in that HDS element as a compressed image.

The method 400 then proceeds to block 408 where the GPT entry and authorization credentials are received. In an embodiment, any of the computing devices 204-214 may be used at block 408 to retrieve data stored in an HDS. For example, at block 408, a user of the computing system 300 may provide, and the HDS engine 304 may receive, a GPT entry that points to a particular HDS, as well as authorization credentials for accessing that HDS. However, while the discussion below provide for the secure access of HDSs via the authentication of authentication credentials, one of skill in the art in possession of the present disclosure will recognize that HDS may be accessed at block 408 without the need for authentication while remaining within the scope of the present disclosure. For example, HDS may be provided according to the teachings of the present disclosure that do not store confidential data and, as such, the authentication requirements to access an HDS may be disabled or otherwise not necessary to access the HDS. As such, in some embodiments of block 408, simply the provisioning of a GPT entry may be sufficient to access the HDS element(s) that provided an HDS.

As discussed below, the provisioning of a GPT entry to an HDS engine 304 in any of the computing devices 204-214 in order to access data stored in an HDS may occur to read data that was written to a redundant HDS that provides a copy of data that was written to a primary storage subsystem, to read data that was written to an extended primary storage HDS that provides extended storage for a computing system, and/or for any other data storage scenario known in the art. At block 408, the HDS engine 304 may operate to authenticate the authentication credentials using authentication techniques known in the art. In the event that the authentication credentials cannot be authenticated, the HDS engine 304 may display a message to the user that provided the GPT entry and authentication credentials that those authentication credentials do not allow access the HDS associated with the GPT entry. While the HDS engine 304 has been discussed above as receiving the GPT entry and, in some cases the authentication credentials at block 408, as discussed below, in some embodiments the remote access controller 308 may be configured to receive the GPT entry and, in some cases the authentication credentials (e.g., through the network), and provide them to the HDS engine 304.

The method 400 then proceeds to block 410 where the GPT is accessed and local HDS element(s) and networked HDS element(s) are determined using the GPT entry. In an embodiment, in response to authenticating the authentication credentials (or in response to receiving the GPT entry in systems that do not require authentication to access the associated HDS), at block 410 the HDS engine 304 will access the GPT located on a local storage device in the computing system 300 (e.g., any of the GPTs 320*a-c* on the storage devices 314-318) and use the GPT entry to identify the local HDS element(s) and the networked HDS element(s) for the HDS associated with that GPT entry.

The method 400 then proceeds to block 412 where access is provided to the local HDS element(s) on local storage device(s) and networked HDS element(s) on networked storage device(s). In an embodiment, upon identifying the local HDS element(s) and the networked HDS element(s) for the HDS associated with the GPT entry received at block 408, the HDS engine 304 may provide the identifiers for the networked HDS element(s) to the remote access controller 308. At block 412, the HDS engine 304 may then access the local HDS element database 310 and the use the local HDS element(s) identified at block 410 to determine the local storage devices that provide those local HDS element(s). For example, the HDS engine 304 may use the identity of a local HDS element determined at block 410 to access the local HDS element database 310 and determine a local storage device and corresponding memory addresses, memory address range, and/or other store device information about the local storage device that indicates where in the local storage device that local HDS element is stored. Furthermore block 412, the remote access controller 308 may access the shared HDS element database 312 and the use the networked HDS element(s) identified at block 410 to determine the networked storage devices that provide those networked HDS element(s). For example, the remote access controller 308 may use the identity of a networked HDS element determined at block 410 to access the networked HDS element database 310 and determine a MAC address of a server or remote access controller that includes the networked storage device where that networked HDS element is stored.

In an embodiment, once each of the local storage device(s) and the networked storage device(s) that include the local HDS element(s) and networked HDS element(s) that provide the HDS are determined, the user that provided the GPT entry at block 408 may be provided access to those local HDS element(s) and networked HDS element(s). For example, in response to a request from the user, any of the data stored on the local HDS element(s) may be retrieved by the HDS engine 304 and provided to the user. Similarly, in response to a request from the user, any of the data stored on the networked HDS element(s) may be retrieved by the remote access controller 308 and provided to the HDS engine 304 for provision to the user. In some embodiments, such data access may be provided as a runtime service when the operating system of the computing system 300 is running, while in other embodiments such data access may be provided in a pre-boot environment when the operating system of the computing system 300 is not running.

Figure 7:
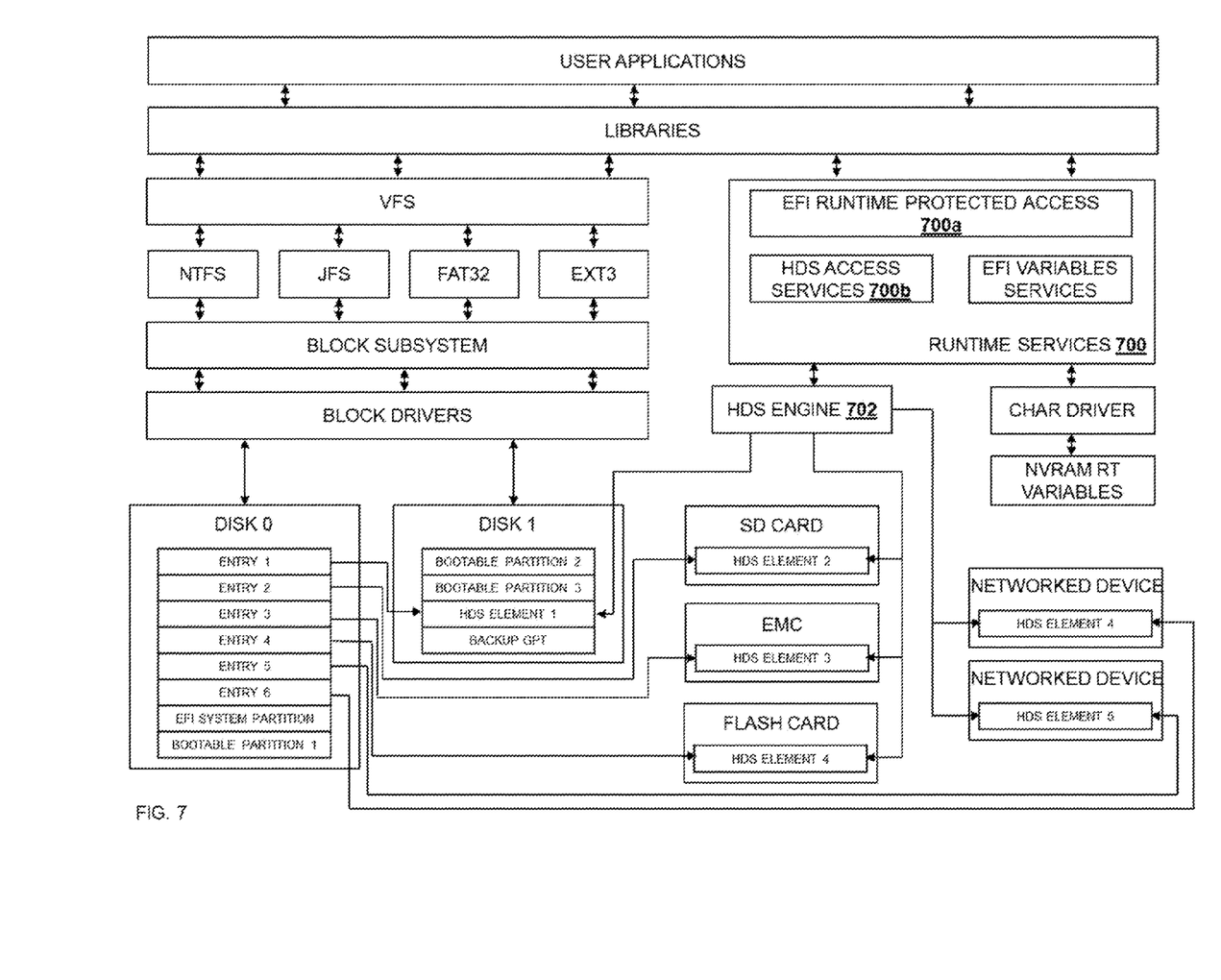
FIG. 7 is a schematic view illustrating an embodiment of operating system real-time services access to a hidden data store.

FIG. 7 illustrates an embodiment of the use of runtime services to provide access to an HDS when an operating system is running on a computing system. As can be seen, runtime services 700 is coupled to an HDS engine 702 (which may be the HDS engine 304 discussed above) and includes an EFI runtime protected access element 700*a* and an HDS access services element 700*b* One of skill in the art in possession of the present disclosure would recognize how the runtime services 700 exposes the operating system file operations (provided by the other elements illustrated in FIG. 7) to access HDSs during runtime using the EFI runtime protected access element 700*a* and the HDS access services element 700*b*. Continuing with the example provided above, a command such as "$cp -HDS c:\Critical data (source file)" provides a copy command ("$cp") with an HDS flag (e.g., "-HDS") that can be processed to internally call runtime services 700 to save data (e.g., "Critical data") in the source file to selected HDS elements identified by an GPT entry (e.g., the DISK 0, DISK 1, SD CARD, EMC, FLASH CARD, and/or NETWORKED DEVICES illustrated in FIG. 7.) Once the data write operation is initiated with a particular storage device, the HDS engine 702 compress that data to provide compressed images that may be stored across each HDS element that provides the HDS.

In a specific example, one or more HDS elements for an HDS may be provided on an SD card, EMC, or other storage device that is controlled or managed by a remote access controller (e.g., the remote access controller 308 in the computing system 300), and those HDS element(s) may be utilized for the redundant storage of critical data that is stored in the primary storage subsystem 218. As discussed below, in such embodiments, in the event a primary storage subsystem failure, or a failure of the operating system in the computing device 204, a user may boot the computing system 204 to an EFI shell, provide the GPT entry for the HDS (as well as authentication credentials if necessary), and retrieve the critical data on the HDS element (e.g., the SD card or EMC) controlled by the remote access controller (e.g., for copying and subsequent provision on a different computing system). In embodiments in which the primary storage subsystem 218 has failed or is otherwise unavailable, the HDS engine 304 may detect that failure and automatically point to the HDS(s) for the data that was being stored on that primary storage subsystem 218 (e.g., the system may default to redundant HDSs when their associated primary storage subsystems become unavailable). In some embodiments, the controller 216 for the primary storage subsystem 218 may be a RAID controller that includes "rapid rebuild drive" technology that provides the controller 216 with the capability to read "good" or otherwise available blocks of data on a storage device that has crashed, gone offline, or otherwise become unavailable (e.g., due to multiple errors occurring on that storage device). Using the teachings of the present disclosure, the controller 216 may read the available blocks of data on an unavailable storage device and retrieve the remaining data from local and/or networked HDS element(s) via an EFI shell in a pre-boot environment as well.

Thus, systems and methods have been described that allows for the protection of critical data by enabling data storage redundancy with easy retrieval of/access to that data via any computing system a network during any type of storage device and/or computer system failure, and one of skill in the art will recognize that the teachings of the present disclosure are useful with conventional pass-through controllers/storage subsystem that include large data volumes that can be erased with a single command. Furthermore, the reflex mapping between the GPT entries and HDS elements discussed above allow for the provision of HDS elements throughout a network, and provide several advantages in data retrieval (particularly when a host computing system has failed) that will be apparent to one of skill in the art in possession of the present disclosure. In a specific example, the reflex mapping and networked HDS elements discussed above allow for easy retrieval of current edit logs in the HADOOP® architecture even when a name node failure occurs (which, as discussed above, typically causes the entire application to slow down due to name node unavailability that results when a secondary name node is down and the current edit logs are unavailable to locate the data nodes).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Globally Unique Identifier (GUID) partition table (GPT) based Hidden Data Store (HDS) system, comprising:
 a network;
 at least one first computing system that is coupled to the network and that includes at least one networked storage device; and
 a second computing system that is coupled to the network and that includes:
  at least one local storage device including a Globally Unique Identifier (GUID) partition table (GPT) that includes a GPT entry that identifies: (1) at least one local Hidden Data Store (HDS) element that provides an HDS and that is included on the at least one local storage device, and (2) at least one networked HDS element that provides the HDS and that is included on the at least one networked storage device; and
  an HDS engine that is configured to:
   receive the GPT entry and authorization credentials; and
   determine that the authorization credentials allow access to the HDS and, in response, provide access to the at least one local HDS element that is included on the at least one local storage device, and provide access to the at least one networked HDS element that is included on the at least one networked storage device.

2. The GPT based HDS system of claim 1, wherein the second computing system includes:
 a local HDS element database that associates the at least one local HDS element identified by the GPT entry with the at least one local storage device; and
 a networked HDS element database that associates the at least one networked HDS element identified by the GPT entry with the at least one networked storage device.

3. The GPT based HDS system of claim 2, wherein the second computing system includes:
 a remote access controller that is configured to utilize the networked HDS element database to provide access to the at least one networked HDS element that is included on the at least one networked storage device.

4. The GPT based HDS system of claim 1, wherein a copy of the GPT is provided on each at least one local storage device and each at least one networked storage device.

5. The GPT based HDS system of claim 1, wherein the HDS engine is configured to:
 receive a request to create a redundant storage for a primary storage subsystem and, in response, create the HDS including the at least one local HDS element that is included on the at least one local storage device, and the at least one networked HDS element that is included on the at least one networked storage device;
 create and store the GPT entry in the GPT; and
 periodically update the at least one local HDS element and the at least one networked HDS element with data provided on the primary storage subsystem.

6. The GPT based HDS system of claim 5, wherein the HDS engine is configured to:
 receive a request to access the data in the primary storage subsystem; and
 determine that the primary storage subsystem is unavailable and, in response, automatically provide access to the data included in the at least one local HDS element and the at least one networked HDS element.

7. The GPT based HDS system of claim 1, wherein the second computing system includes:
 a remote access controller that is configured, when an operating system for the second computing system is unavailable, to:
 receive the GPT entry and the authorization credentials;
 determine that the authorization credentials allow access to the HDS and, in response, provide access to the at least one local HDS element that is included on the at least one local storage device, and provide access to the at least one networked HDS element that is included on the at least one networked storage device.

8. An Information Handling System (IHS), comprising:
 a communication system;
 at least one local storage device;

a processing system that is coupled to the communication system and the at least one storage device; and
a memory system that is coupled to the processing system and that includes instruction that, when executed by the processing system, cause the processing system to:
receive a GPT entry and authorization credentials;
determine that the authorization credentials allow access to a Hidden Data Store (HDS) and, in response, access a Globally Unique Identifier (GUID) partition table (GPT) that includes the GPT entry that identifies: (1) at least one local HDS element that provides the HDS and that is included on at least one local storage device included in the first computing system, and: (2) at least one networked HDS element that provides the HDS and that is included on at least one networked storage device that is coupled to the communication system; and
providing access to the at least one local HDS element that is included on the at least one local storage device, and providing access to the at least one networked HDS element that is included on the at least one networked storage device.

9. The IHS of claim 8, further comprising:
a local HDS element database that associates the at least one local HDS element identified by the GPT entry with the at least one local storage device; and
a networked HDS element database that associates the at least one networked HDS element identified by the GPT entry with the at least one networked storage device.

10. The IHS of claim 9, further comprising:
a remote access controller that is configured to utilize the networked HDS element database to provide access to the at least one networked HDS element that is included on the at least one networked storage device.

11. The IHS of claim 8, wherein the memory system includes instruction that, when executed by the processing system, cause the processing system to:
receive a request to create a redundant storage for a primary storage subsystem and, in response, create the HDS including the at least one local HDS element that is included on the at least one local storage device, and the at least one networked HDS element that is included on the at least one networked storage device;
create and store the GPT entry in the GPT; and
periodically update the at least one local HDS element and the at least one networked HDS element with data provided on the primary storage subsystem.

12. The IHS of claim 11, wherein the memory system includes instruction that, when executed by the processing system, cause the processing system to:
receive a request to access the data in the primary storage subsystem; and
determine that the primary storage subsystem is unavailable and, in response, automatically provide access to the data included in the at least one local HDS element and the at least one networked HDS element.

13. The IHS of claim 12, wherein the memory system includes instruction that, when executed by the processing system, cause the processing system to provide an operating system, and wherein the IHS further comprises:
a remote access controller that is configured, when the operating system is unavailable, to:
receive the GPT entry and the authorization credentials;
determine that the authorization credentials allow access to the HDS and, in response, provide access to the at least one local HDS element that is included on the at least one local storage device, and provide access to the at least one networked HDS element that is included on the at least one networked storage device.

14. A method for providing a hidden data store, comprising:
receiving, by a computing system, a GPT entry and authorization credentials; and
determining, by the computing system, that the authorization credentials allow access to a Hidden Data Store (HDS) and, in response, accessing a Globally Unique Identifier (GUID) partition table (GPT) that includes the GPT entry that identifies: (1) at least one local HDS element that provides the HDS and that is included on at least one local storage device included in the first computing system, and (2) at least one networked HDS element that provides the HDS and that is included on at least one networked storage device that is coupled to the computing system through a network; and
providing, by the computing system, access to the at least one local HDS element that is included on the at least one local storage device, and providing access to the at least one networked HDS element that is included on the at least one networked storage device.

15. The method of claim 14, further comprising:
utilizing, by an HDS engine in the computing system, a local HDS element database that associates the at least one HDS element identified by the GPT entry with the at least one local storage device.

16. The method of claim 14, further comprising:
utilizing, by a remote access controller in the computing system, a networked HDS element database that associates the at least one networked HDS element identified by the GPT entry with the at least one networked storage device.

17. The method of claim 14, wherein a copy of the GPT is provided on each at least one local storage device and each at least one networked storage device.

18. The method of claim 14, further comprising:
receiving, by the computing system, a request to create a redundant storage for a primary storage subsystem and, in response, creating the HDS including the at least one local HDS element that is included on the at least one local storage device, and the at least one networked HDS element that is included on the at least one networked storage device;
creating and storing, by the computing system, the GPT entry in the GPT; and
periodically updating, by the computing system, the at least one local HDS element and the at least one networked HDS element with data provided on the primary storage subsystem.

19. The method of claim 18, further comprising:
receiving, by the computing system, a request to access the data in the primary storage subsystem; and
determining, by the computing system, that the primary storage subsystem is unavailable and, in response, automatically providing access to the data included in the at least one local HDS element and the at least one networked HDS element.

20. The method of claim 14, further comprising:
receiving, by a remote access controller in the computing system while an operating system for the computing system is unavailable, the GPT entry and the authorization credentials;
determining, by the remote access controller in the computing system while the operating system for the computing system is unavailable, that the authorization credentials allow access to the HDS and, in response, providing access to the at least one local HDS element that is included on the at least one local storage device, and provide access to the at least one networked HDS element that is included on the at least one networked storage device.

\* \* \* \* \*